(No Model.)
2 Sheets—Sheet 1.
J. F. SEIBERLING.
GRAIN BINDING HARVESTER.
No. 325,871. Patented Sept. 8, 1885.
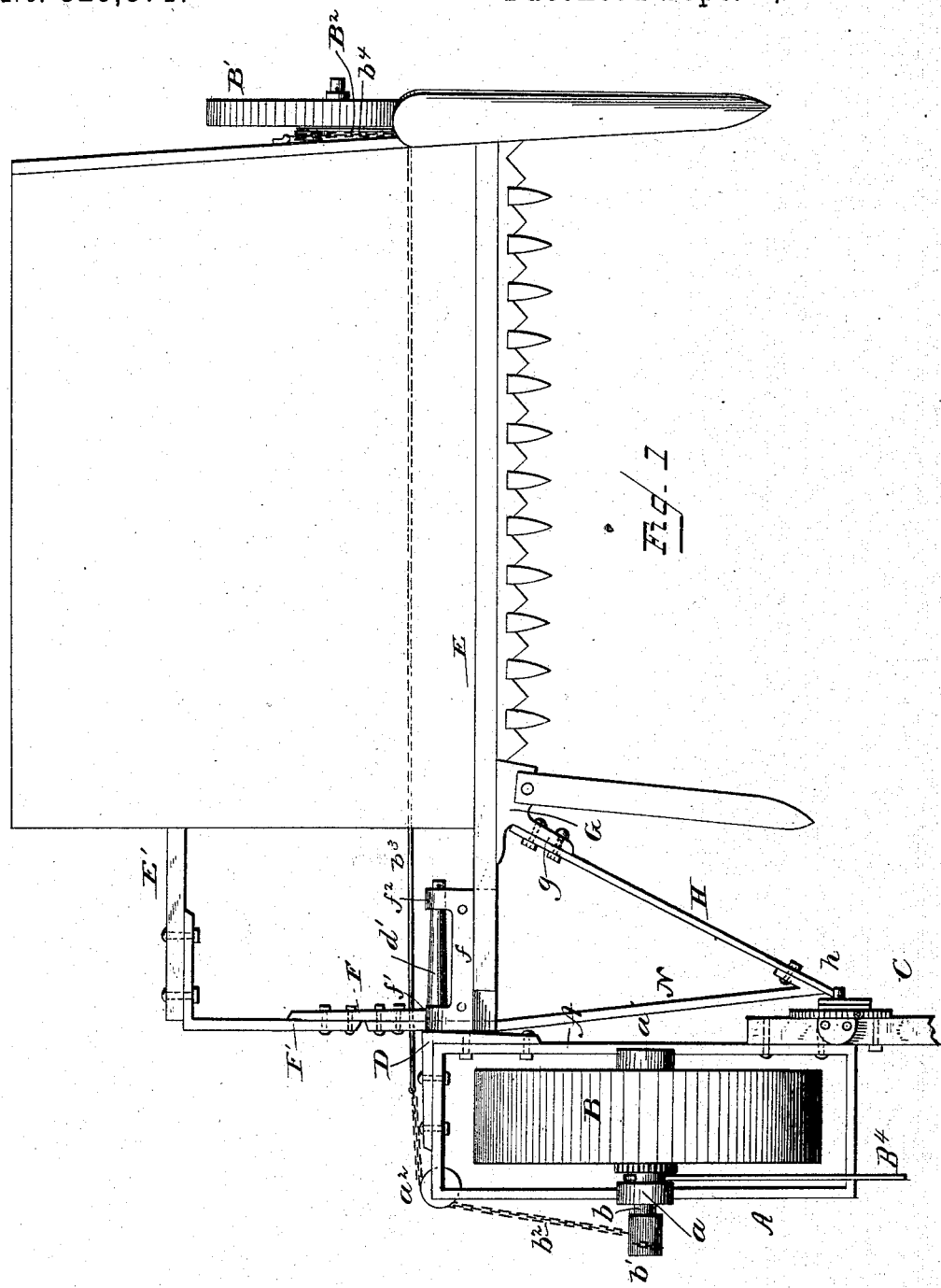
WITNESSES
INVENTOR
John F. Seiberling
by A. M. Smith
Attorney

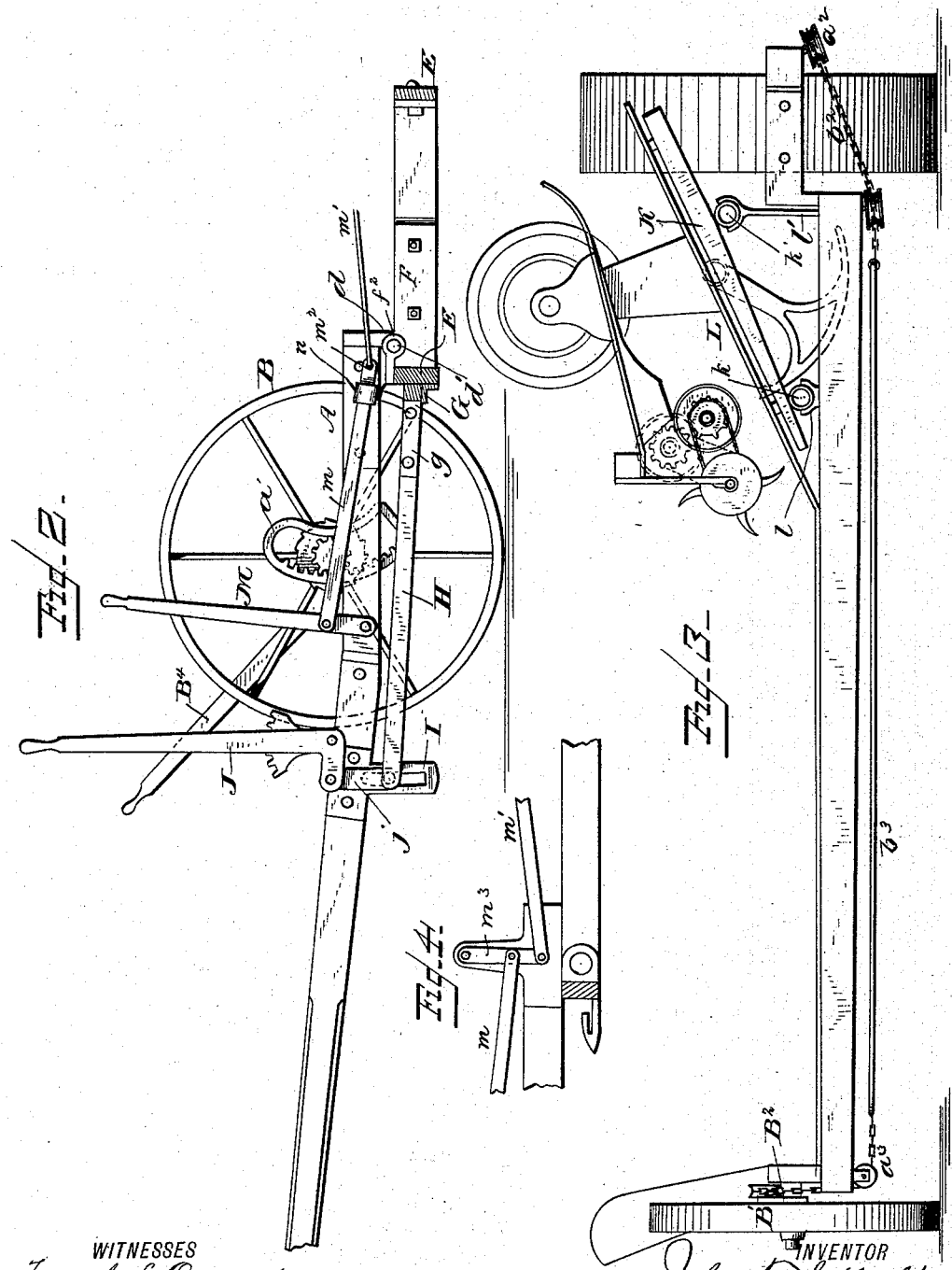

UNITED STATES PATENT OFFICE.

JOHN F. SEIBERLING, OF AKRON, OHIO.

GRAIN-BINDING HARVESTER.

SPECIFICATION forming part of Letters Patent No. 325,871, dated September 8, 1885.

Application filed February 14, 1884. (No model.)

*To all whom it may concern:*

Be it known that I, JOHN F. SEIBERLING, of Akron, county of Summit, State of Ohio, have invented a new and useful Improvement in Grain-Binding Harvesters, of which the following is a full, clear, and exact description, reference being had to the accompanying drawings, making part of this specification.

My invention relates to the manner of connecting the platform-frame of the machine with the main or wheel frame in machines employing but a single drive-wheel for upholding the main frame and the end of the platform-frame connected with said main frame, to the arrangement of the binder table and mechanism relative to the main and platform frames, and to the arrangement of means for effecting the adjustment of the binder table and mechanism on the hinged and adjustable platform-frame.

It consists in connecting the platform-frame at its front inner corner with the rear grain-side corner of the main or driving wheel frame by a transverse hinge upon which the platform-frame can be rocked or tilted, an adjusting brace or lever rigidly connected at its rear end to the platform at or near the inner shoe or inner end of the cutting apparatus and extending thence obliquely forward and inward and connected adjustably at its forward end to the rear end of the tongue or side of the wheel-frame, at or near its forward end, for stiffening the attachment between the two frames and permitting the adjustment or rocking of the platform-frame on the transverse hinge, and also an additional brace or lever connected at one end to the last-named brace and extending to and supporting the forward corner of the platform.

It further consists in locating the inclined elevating binder-table and binding mechanism on the inner end of a platform connected with the main or drive wheel frame as above described, whereby they are made to rock or tilt with the hinged platform-frame, while at the same time the bundles are adapted to be discharged so that the butts will pass over the rear portion and below the crown of the drive-wheel or entirely behind the wheel, as may be desired, and the necessity for carrying them up over said wheel is avoided; and it further consists in an arrangement of means controlled by the driver on the main frame for adjusting or moving the binder table and mechanism forward or backward on the hinged platform-frame to adapt them to the grain to be operated upon, all as hereinafter described.

In the accompanying drawings, Figure 1 is a plan view of so much of a harvesting-machine as is necessary to show the arrangement of the main and platform frames and the means for connecting them. Fig. 2 represents the main frame, driving-wheel, and the devices connecting platform and main frames in side elevation, the platform-frame being shown in section. Fig. 3 is a rear elevation showing the binder frame, table, and enough of the binder mechanism to show the location of said parts relatively to the platform and main frames and driving-wheel. Fig. 4 shows a modification in the link arrangement for adjusting the binder-frame.

A represents the main-wheel frame, of open rectangular form, surrounding the driving-wheel B, and made preferably of bar-iron bent into the required shape; but any suitable material may be employed. The opposite sides of this frame are provided with slotted brackets or standards $a$ $a'$, the slots in which are curved in the arc of a circle of which the secondary or pinion shaft is the center, and each has one of its walls toothed, to engage a pinion fast on the axle $b$, for adapting the latter, when rotated, to raise or lower the frame A in a manner well understood. To the inner side of the frame A, at its forward end, the tongue C is rigidly secured, and to the rear inner corner of said frame an angular bracket, D, matching said corner, is bolted or otherwise rigidly secured. This bracket, at its angle, has a pendent portion or arm, $d$, upon which is formed a laterally-projecting pivotal pin, $d'$, through which the platform-frame is connected with the main-wheel frame A, as will be hereinafter explained.

The axle $b$ is provided on its outer end with a drum or pulley, $b'$, from which a chain, $b^2$, extends around a guiding-sheave, $a^2$, at the rear outer corner of frame A, thence through a rod, $b^3$, and chain $b^4$ around a pulley, $a^3$, at the grain side of the platform-frame, and up over a sheave upon a pivoted arm or segment, $B^2$, to which the grain-wheel $B'$ is journaled, and thence down to a fixed point of attachment to the outer end of the platform-frame, the arrangement being similar to that described in Letters Patent granted to me December 18, 1883, No. 290,884, in which, when the axle $b$ is rotated for raising or lowering the frame A and inner end of the platform-frame, the outer end of the latter will be simultaneously adjusted. A lifting-lever, $B^4$, acts through a pawl and a ratchet-wheel fast on the axle for rotating the latter; but these parts being fully described in the Letters Patent referred to, a detailed description of them here is unnecessary.

The platform frame is composed of front and rear sills, E and E′, and suitable longitudinally-arranged connecting-bars, that at the inner end being by preference made in the form of two angle-irons, F and F′, the former rigidly connected by its transverse arm $f$ to the forward sill, and the latter, F′, to the rear sill, their lapping longitudinal arms being rigidly bolted together, as shown. The transverse arm $f$ of the iron F has formed upon its rear face perforated lugs or ears $f'$ $f^2$, which fit and are adapted to turn on the pivotal pin $d'$, above referred to, and form, in connection with the latter, a transverse hinge or pivotal connection of the platform-frame with the main frame.

The forward sill, E, has connected with it, at or near the inner end of the cutting apparatus, and preferably to the inner shoe, G, thereof, an arm, $g$, to which is rigidly secured a brace or arm, H, which extends obliquely forward and inward toward the main frame, and is secured by means of a headed pin or bolt at $h$ to a pendent slotted bracket, I, secured by through-bolts to the rear end of the tongue and forward end of the inner side bar of the main frame. The bracket I has a vertical slot formed in it, formed in the arc of a circle of which the pivotal pin $d'$ is the center, and the pin $h$, passing through said slot and connecting the brace or lever H with the bracket I, is adapted to slide or be adjusted up and down in said slot for varying the height of the forward end of the brace or arm H, and rocking the platform-frame on its pivotal or hinge connection with the main frame. The pin $h$ or forward end of the brace or arm H has pivoted to it the lower end of a short link, $j$, the upper end of which is pivoted to the short horizontal arm of a bell-crank lever, J, by the adjustment of the upright arm of which the attendant can adjust the arm H and the angle of relation of the platform-frame to the ground, as desired.

By the construction described it will be seen that while the platform-frame is connected with the main wheel-frame by a transverse hinge located at or near the rear corner of the main-wheel frame and at the forward corner of the adjacent end of the main-wheel frame, practically, and except for the purposes of adjustment, as explained, the connection of the platform-frame with the main-wheel frame is a rigid one, and the hinge or transverse pivotal connection is thus made to serve a threefold purpose—viz., as a support for the inner end of the platform-frame, as a hinge upon which the platform can be rocked, and as a means for holding the single drive-wheel in an upright or working position. The brace, under the arrangement shown and described, also serves a threefold purpose—viz., to prevent the rocking or straining of the platform-frame by the backward drag and thrust upon it, to hold the said frame at right angles to the main frame and relieve the strain on the hinge, and as a means of adjusting or rocking the platform on said hinge.

An additional supporting arm or brace, N, is also provided, extending from near the outer extremity of brace H, to which it is bolted or otherwise rigidly secured, to the forward inner corner of the platform, its office being to support and uphold that portion of the platform and prevent it from settling down under the weight of the binder-platform and its mechanism. The said bar N extends under the transverse hinge and is connected rigidly to the platform, and being, as above stated, secured rigidly to brace H at its other end, it is adapted to rise and fall with brace H when the platform is tilted.

The lever for tilting the platform may be connected directly to brace N, if preferred, and the platform may be adjusted through the medium of brace N, instead of lever or brace H, as above described.

The arrangement of the frame as described brings the platform substantially in the rear of the transverse plane of the rear portion of the drive-wheel, and adapts the grain to be discharged behind the drive-wheel or the butt end of the grain over the rear portion and below the crown of the wheel, thereby obviating the necessity for elevating the grain as high as in machines where it has to be discharged over the wheel.

The binder-table and as much of the binder mechanism as is necessary to show the arrangement of said parts relatively to the platform, main frame, and driving-wheel are shown in the rear elevation, Fig. 3. The binder-frame is composed of longitudinal tubular bars $k$ $k'$ and inclined transverse bars K, connecting the tubular bars and supporting the slotted platform L, the bars $k$ and $k'$ being supported in suitable standard brackets, $l$ $l'$, secured to the platform-frame sills, the brackets $l'$ at the stubble side of the frame being higher than those at the grain or platform side, for giving the desired inclination to the table. The table L extends from the inner or delivery end of the grain-platform or platform-carrier to a point behind and about in the vertical longitudinal plane of the main drive-wheel for adapting the bundles to be discharged behind said wheel or upon the stubble side thereof, as may be desired. This arrangement makes it practicable to employ a binder-table having but a slight upward inclination, just sufficient to afford room for the needle or that part of the compressing or packing or binding devices operating from beneath the table, as shown, thereby reducing the labor and attendant difficulties of elevating the grain as compared with machines in which the grain is discharged over the wheel.

The binder-frame in practice is made adjustable longitudinally in the brackets $l$ and $l'$ in a manner similar to that described in Letters Patent No. 269,332, referred to, or in any other suitable manner, to adapt the binding mechanism to place the band at or near the center of of the length of the bundle.

To prevent the disturbance of the binder table and mechanism by their adjusting devices when the platform is rocked or adjusted on its transverse hinge, the link connecting the lever M, which is supported on the main-wheel frame with the binder-frame for adjusting the latter, is jointed or made in two parts, $m$ and $m'$, pivoted together at $m^2$ in close proximity with the transverse hinge between the platform-frame and wheel-frame, the part $m$, sliding in a steadying-loop, $n$, secured to the side of the main-wheel frame. By this arrangement the part $m'$ swings in the adjustment of the platform-frame on its hinge upon a pivot as nearly as may be coincident with said hinge, and so prevents any perceptible disturbance of the binder frame.

The parts $m$ and $m'$ of the link may, if preferred, be connected through a pendent swinging arm or link, $m^3$, the lower end of which swings in close proximity with the hinge-pin $d'$, as shown in detail view, Fig. 4, and has the part $m'$ of the link connected with it.

The binding mechanism may be of the well-known Appleby type, or any other suitable form of mechanism may be employed, such as is adapted to bind the grain upon an inclined table, which elevates in the process of discharging the grain.

Having now described my invention, I claim as new—

1. The combination of the main frame, its single supporting and main drive wheel, the grain-platform connected to the main frame at or near the rear inner corner by a single transverse hinge arranged to support the main wheel in an upright position and allow said platform to rock, the brace connected as described, a binding apparatus located on the inner end of said hinged platform-frame, and means for adjusting the same, substantially as described.

2. The combination of the main or wheel frame, the platform-frame connected with said main frame by a transverse hinge at or near the inner rear corner of the latter, the adjustable binder-frame located on the inner end of said hinged platform-frame, and a jointed link connecting said binder-frame with an adjusting lever on the main frame, substantially as described.

3. In a harvesting-machine having a single supporting-wheel for the main frame, the grain-platform connected to said main frame at or near the inner corner of the latter by means of a single transverse hinge adapted to hold the drive-wheel frame in proper working position, in combination with the braces H and N, rigidly secured at their rear ends to said platform, and at their other ends connected to the rigid tongue or main frame by an adjustable connection adapted in connection with said transverse hinge to support said platform and allow the same to be tilted, substantially as described.

In testimony whereof I have hereunto set my hand this 4th day of February, A. D. 1884.

JOHN F. SEIBERLING.

Witnesses:
L. K. MILES,
H. M. HOUSER.